United States Patent
Mai et al.

(10) Patent No.: US 7,871,503 B2
(45) Date of Patent: Jan. 18, 2011

(54) ELECTROCHEMICAL DISCHARGE MACHINING DEVICE

(75) Inventors: Chao-Chuang Mai, Taichung County (TW); Chin-Hui Chen, Taichung County (TW); Ming-Ji Chen, Yunlin County (TW); Der-Shuen Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 960 days.

(21) Appl. No.: 11/695,376

(22) Filed: Apr. 2, 2007

(65) Prior Publication Data

US 2008/0156639 A1  Jul. 3, 2008

(30) Foreign Application Priority Data

Dec. 28, 2006  (TW) .............................. 95149464 A

(51) Int. Cl.
    *B23H 7/18*  (2006.01)
    *B23H 7/30*  (2006.01)
(52) U.S. Cl. .................. 204/228.8; 205/642; 219/69.17
(58) Field of Classification Search .............. 204/228.8; 205/642; 219/69.17
    See application file for complete search history.

(56) References Cited

U.S. PATENT DOCUMENTS

| 4,367,389 A | * | 1/1983 | Inoue ...................... 219/69.17 |
| 6,679,985 B2 | | 1/2004 | Kim et al. |
| 6,835,299 B1 | * | 12/2004 | Tchugunov ................. 205/654 |

FOREIGN PATENT DOCUMENTS

| JP | 05-069231 | 3/1993 |
| TW | 536436 B | 6/2003 |

* cited by examiner

*Primary Examiner*—Alexa D. Neckel
*Assistant Examiner*—Nicholas A. Smith

(57) ABSTRACT

An electrochemical discharge machining device includes a base, a sensor disposed on the base, a shaft rotatably disposed on the base, an electrode disposed at one end of the shaft and contacting with a work piece, an isolating element disposed between the sensor and the shaft, and a control module connected to the sensor. Current flows to the electrode via the shaft to machine the work piece, and the force exerted on the electrode by the work piece is transmitted via the shaft and the isolating element to the sensor converting the force into a signal sent to the control module for raising or lowering the base to maintain contact between the electrode and the work piece. The sensor serves as a detecting mechanism to ensure appropriate contact between the electrode and the work piece.

13 Claims, 3 Drawing Sheets

ELECTROCHEMICAL DISCHARGE MACHINING DEVICE

BACKGROUND OF THE INVENTION

1. Field of the Invention

The invention relates to an electrochemical discharge machining device, and more particularly to an electrochemical discharge machining device converting force on an electrode into a signal controlling the electrode contacting a work piece.

2. Description of the Related Art

In a conventional electric discharge machining method (EDM), work pieces are not limited by their mechanical characteristics, such as strength and hardness. EDM, however, is not applicable to non-conductive work materials such as glass or ceramic. The electrochemical discharge machining method (ECDM) employs the electrochemical reaction of conductive liquid to generate isolative gas and electrical spark discharge, which melts the surface of a work piece. Hard materials are frequently used for machining, thus, ECDM is important for industrial applications.

EDM employs average gap voltage or average spark delay time to control feed rate and feed direction, thus, gap dimensions and machining stability are controlled. When ECDM is performed, the electrode must be very close to or in contact with the work piece. If the feed rate is improper, efficiency may be reduced and the electrode may impact the work piece and possibly damage or break the electrode.

BRIEF SUMMARY OF INVENTION

An electrochemical discharge machining (ECDM) device is provided. An exemplary embodiment of an ECDM device of the invention comprises a base, a sensor disposed on the base, a shaft rotatably disposed on the base, an electrode disposed at one end of the shaft and contacting with a work piece, an isolating element disposed between the sensor and the shaft, and a control module connected to the sensor. Current flows to the electrode via the shaft to machine the work piece. Force exerted on the electrode by the work piece is transmitted via the shaft and the isolating element to the sensor. Force is converted into a signal and sent to the control module. The control module raises or lowers to maintain the contact between the electrode and the work piece. The sensor serves as a detecting mechanism to ensure the appropriate contact between the electrode and the work piece.

The ECDM device further comprises a conductive element disposed between the isolating element and the shaft. Current flows into the shaft and the electrode via the conductive element.

The ECDM device further comprises an auxiliary mechanism disposed on the base. The auxiliary mechanism comprises a V-shaped groove along which the shaft rotatably extends.

The ECDM device further comprises a conductive ball, by which current flows to the shaft and the electrode, disposed in a recess formed at another end of the shaft. The ECDM device further comprises a conductive element disposed between the isolating element and the shaft, wherein current flows into the shaft and the electrode via the conductive element.

The ECDM device further comprises a motor and a belt. The shaft of the ECDM device comprises a pulley joined to the motor by the belt, thus, the motor rotates the shaft.

The sensor comprises a metal block and a strain gauge disposed on the metal block. The metal block is deformed by force transmitted to the sensor and detected by the strain gauge for conversion into a signal.

In another embodiment, the sensor comprises a strain gauge disposed on the isolating element, and the isolating element is deformed by force transmitted to the sensor and detected by the strain gauge for conversion into a signal.

The control module comprises a position controller for raising and lowering the base. The control module further comprises a feed controller, wherein the signal from the sensor is compared with a predetermined standard signal to output a control signal to the position controller to raise or lower the base.

The control module further comprises a low pass filter and an analog/digital converter (ADC). Subsequent to filtering by the low pass filter and conversion into a digital signal by the ADC, the signal is sent to the feed controller from the sensor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
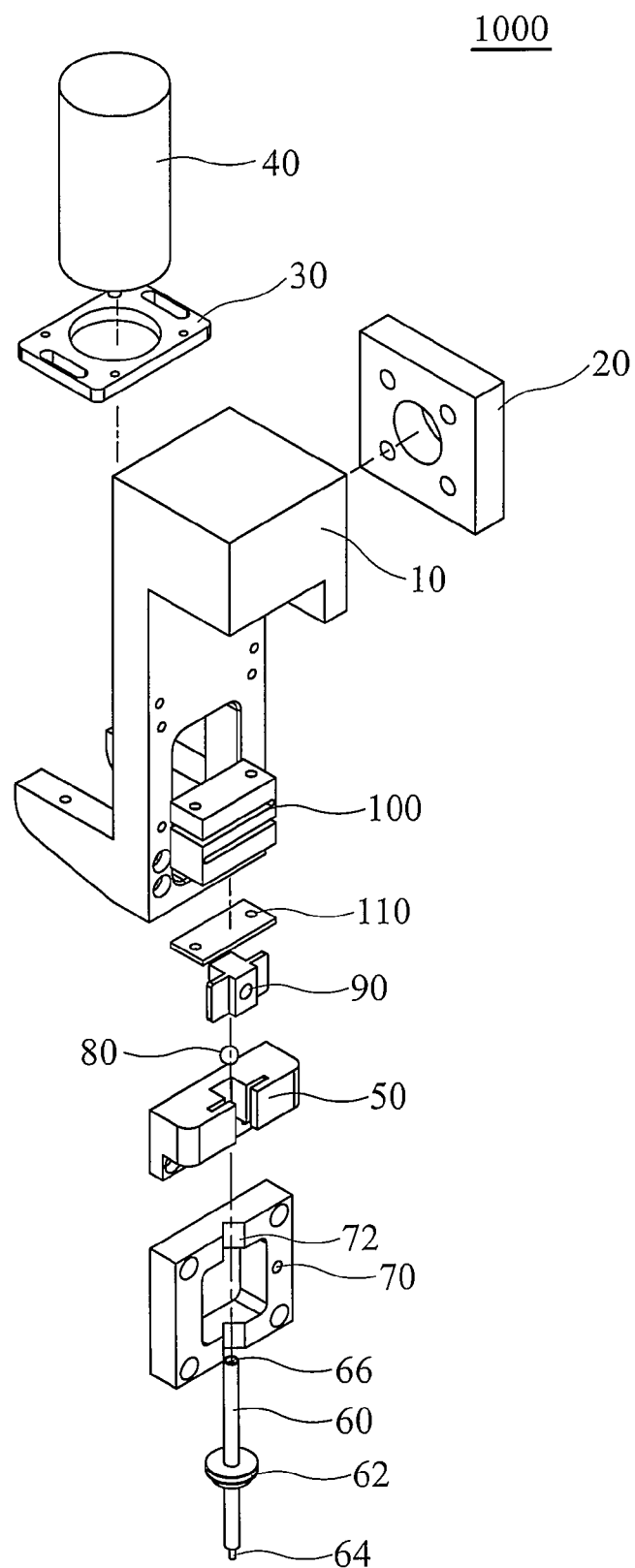
FIG. 1 is a perspective exploded view of an ECDM device of an embodiment of the invention.
Figure 2:
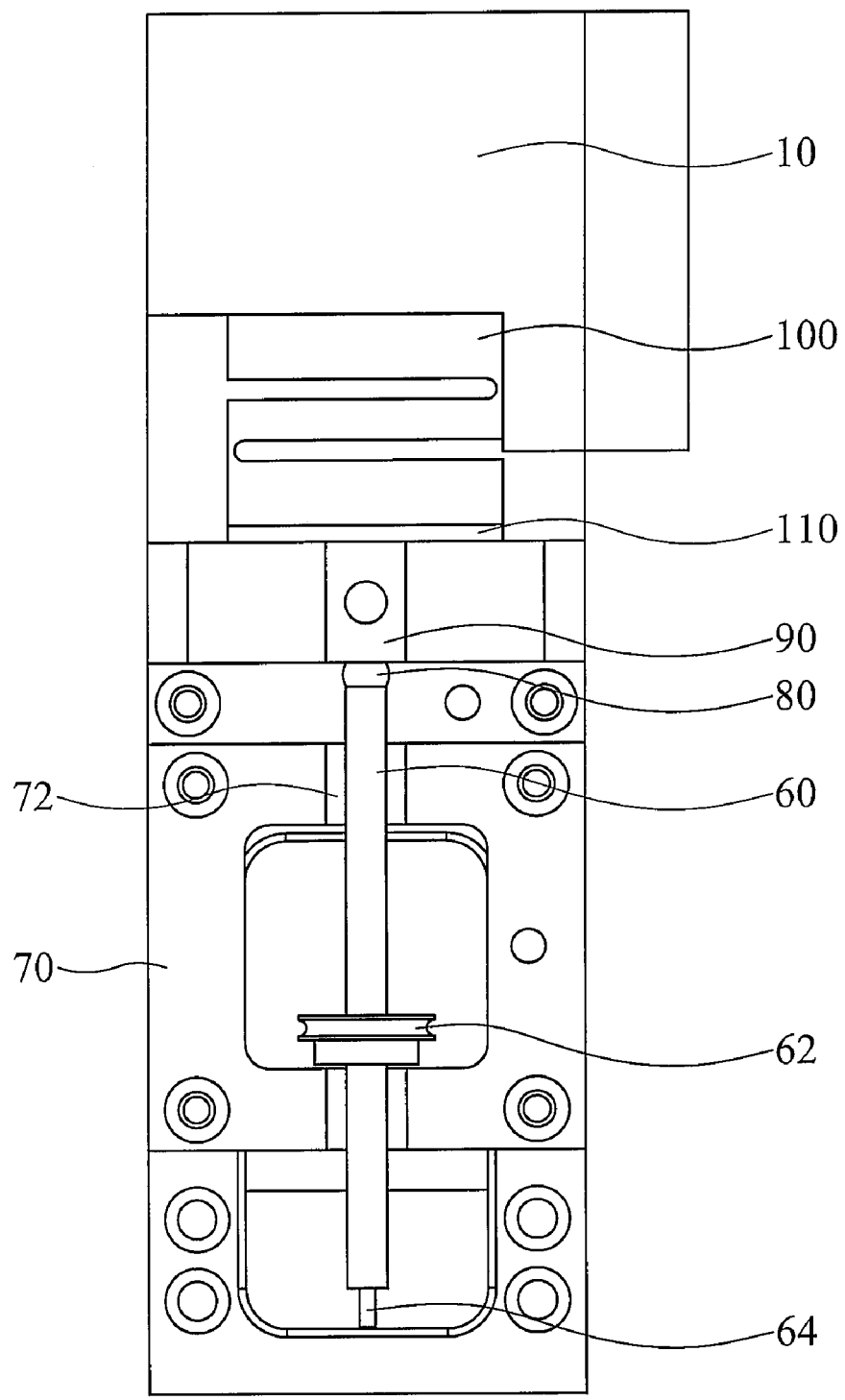
FIG. 2 is a front view of an ECDM device of an embodiment of the invention.

Referring to FIGS. 1 and 2, an ECDM device 1000 of the invention comprises a base 10, a holder 20, a fixing sheet 30, a motor 40, an insulated seat 50, a shaft 60, an electrode 64, an auxiliary mechanism 70, a conductive ball 80, a conductive element 90, a load cell (sensor) 100 and an isolating element 110.

The auxiliary mechanism 70 disposed on the base 10 comprises a V-shaped groove 72 on which the shaft 60 extends and rotates. The shaft 60 has a pulley 62 rotated by a motor 40 and a belt (not shown) joining the motor 40 and the pulley 62. The motor 40 is fixed to the base 10 by the fixing sheet 30. The electrode 64 is disposed at one end of the shaft 60 and a recess 66 is formed at the other end of the shaft 60. The electrode 64 makes contact with a work piece for electrochemical discharge machining. The conductive ball 80 is disposed in the recess 66 for stabilizing rotation of the shaft 60. The conductive element 90 is disposed on the insulated seat 50 fixed to base 10. Current from a power supply (not shown) is conducted to the electrode 64 via the conductive ball 80 and the conductive element 90. The base 10 is disposed on the holder 20 exchanged with other devices by a tool exchanger (not shown). The load cell 100 is fixed to the base 10. The isolating element 110 is disposed between the load cell 100 and the base 10. Force exerted on the electrode 64 by the work piece is transmitted to the load cell 100 via the shaft 60, the conductive ball 80 and the isolating element 110 and converted to a signal by the load cell 100.

Figure 3:
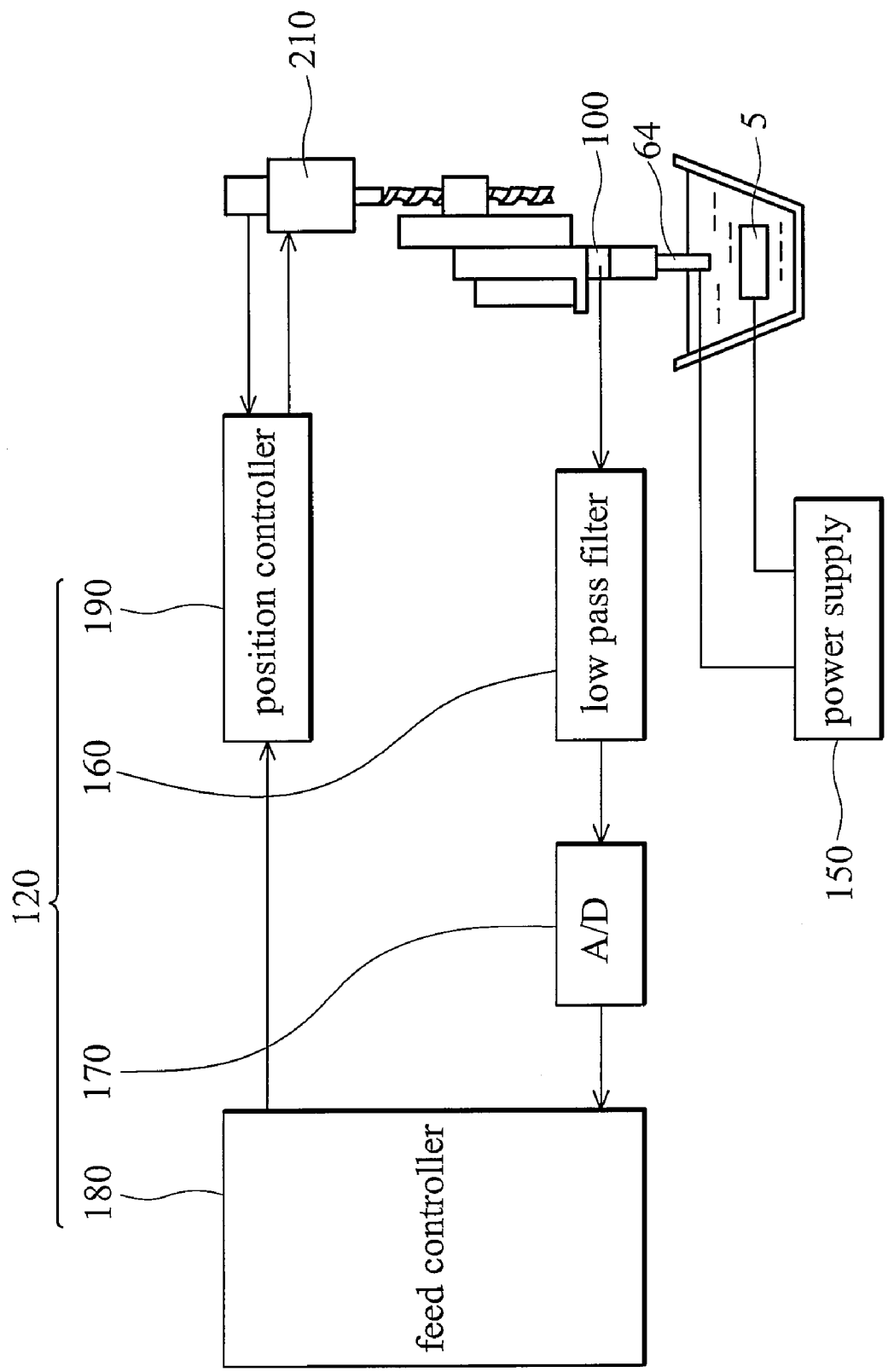
FIG. 3 is a block diagram of an ECDM device of an embodiment of the invention.

Referring to FIG. 3, the signal is sent to a control module 120 controlling the base 10 to rise or lower, whereby the electrode 64 makes proper contact with the work piece to avoid damage. The control module 120 comprises a low pass filter 160, an analog/digital converter (ADC) 170, a feed controller 180 and a position controller 190. The signal from the load cell 100 is filtered by the low pass filter 160 to eliminate high frequency noise, and converted into a digital signal by ADC 170. The digital signal is compared with a predetermined standard signal in the feed controller 180 to generate a feed value which is sent to the position controller 190 to control a servo motor 210 or a position detecting device. Power supply 150 supplies current to the electrode 64 and the work piece 5 for electrochemical discharge machining.

Although a load cell is given as an example of a sensor for detecting force, a strain gauge may also be used. A metal block is disposed on the base 10. The strain gauge is bonded to the metal block. The isolating element 110 is disposed between the metal block and the conductive element 90. The force exerted on the electrode 64 from the work piece is transmitted to the metal block via the shaft 60, the conductive element 90, and the isolating element 110 to deform the metal block. The deformation is detected and converted into a signal by the strain gauge.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrochemical discharge machining device, comprising
    a base;
    a sensor disposed on the base;
    a shaft rotatably disposed on the base;
    an electrode disposed at one end of the shaft and contacting with a work piece;
    an isolating element disposed between the sensor and the shaft; and
    a control module connected to the sensor, wherein current flows to the electrode via the shaft to machine the work piece, and the force exerted on the electrode by the work piece is transmitted via the shaft and the isolating element to the sensor converting the force into a signal sent to the control module for raising or lowering the base to maintain contact between the electrode and the work piece.

2. The electrochemical discharge machining device as claimed in claim 1 further comprising a conductive element disposed between the isolating element and the shaft, wherein current flows into the shaft and the electrode via the conductive element.

3. The electrochemical discharge machining device as claimed in claim 1 further comprising an auxiliary mechanism having a V-shaped groove along which the shaft rotatably extends disposed on the base.

4. The electrochemical discharge machining device as claimed in claim 1 further comprising a conductive ball disposed in a recess formed at another end of the shaft, wherein current flows to the shaft and the electrode via the conductive ball.

5. The electrochemical discharge machining device as claimed in claim 4 further comprising a conductive element disposed between the isolating element and the shaft, wherein current flows into the shaft and the electrode via the conductive element.

6. The electrochemical discharge machining device as claimed in claim 1 further comprising a motor and a belt, wherein the shaft has a pulley joined to the motor by the belt, whereby the motor rotates the shaft.

7. The electrochemical discharge machining device as claimed in claim 6 further comprising a fixing sheet by which the motor is fixed to the base.

8. The electrochemical discharge machining device as claimed in claim 1, wherein the sensor comprises a piezoelectric load cell.

9. The electrochemical discharge machining device as claimed in claim 1, wherein the sensor comprises a metal block and a strain gauge disposed on the metal block, and the metal block is deformed by force transmitted to the sensor and detected by the strain gauge for conversion into the signal.

10. The electrochemical discharge machining device as claimed in claim 1, wherein the sensor comprises a strain gauge disposed on the isolating element, and the isolating element is deformed by force transmitted to the sensor and detected by the strain gauge for conversion into the signal.

11. The electrochemical discharge machining device as claimed in claim 1, wherein the control module comprises a position controller controlling the base to rise or lower.

12. The electrochemical discharge machining device as claimed in claim 11, wherein the control module further comprises a feed controller, wherein the signal from the sensor is compared with a predetermined standard signal to output a control signal to the position controller to lift or lower the base.

13. The electrochemical discharge machining device as claimed in claim 12, wherein the control module further comprises a low pass filter and an analog/digital converter, the signal from the sensor is filtered by the low pass filter and converted into a digital signal by the analog/digital converter, which is sent to the feed controller.

* * * * *